INVENTORS
JAMES P. LAMBOY
ROBERT L. MC DONALD
BY *Thomson & Schorn*

ATTORNEYS

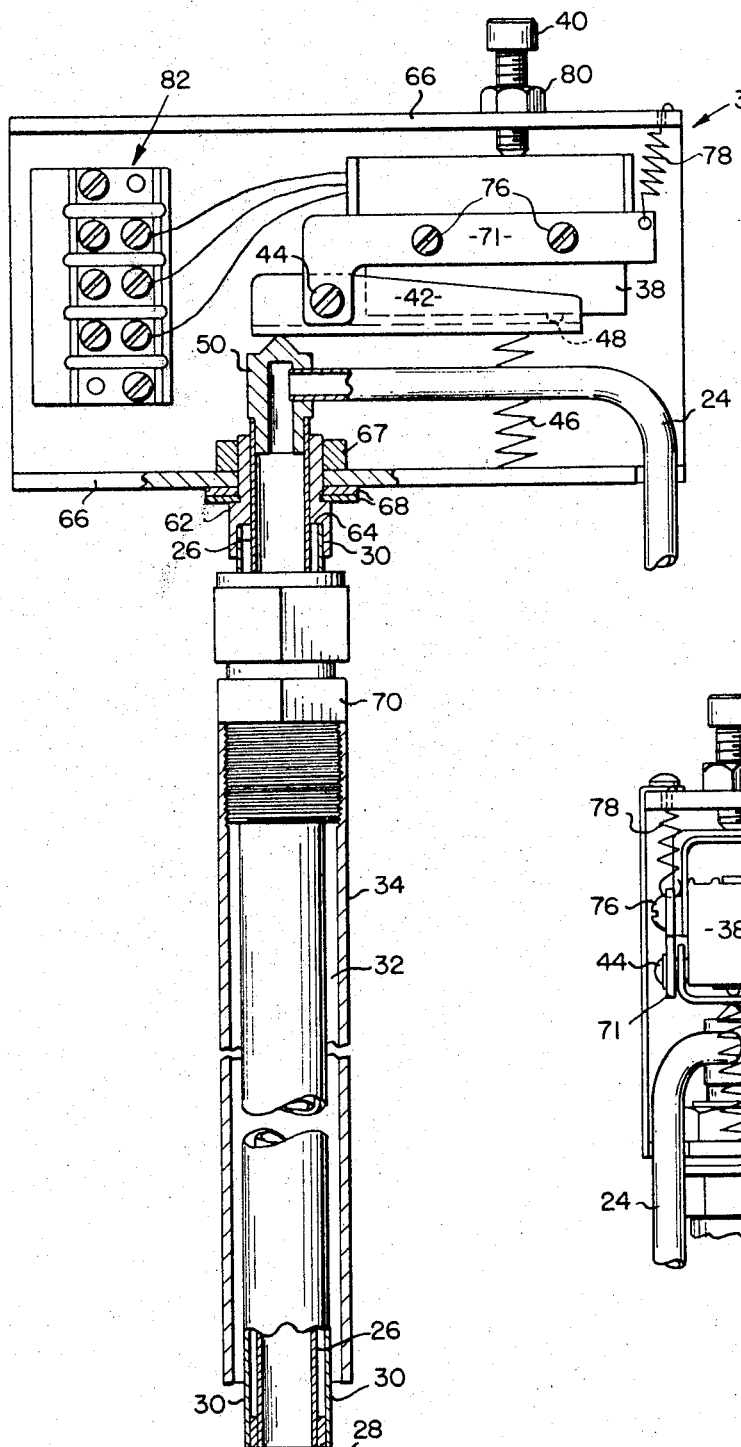
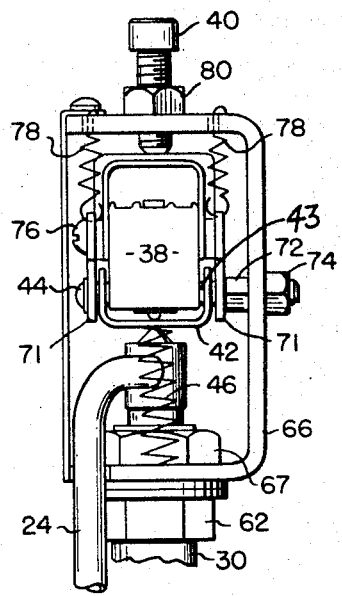

United States Patent Office 3,454,352
Patented July 8, 1969

3,454,352
METHOD AND APPARATUS CONTROLLING STERILIZERS
James P. Lamboy, Victor, and Robert L. McDonald, Rochester, N.Y., assignors to Sybron Corporation, a corporation of New York
Filed Mar. 23, 1966, Ser. No. 536,783
Int. Cl. A61l 3/00, 1/00; G05d 23/00
U.S. Cl. 21—56
22 Claims

ABSTRACT OF THE DISCLOSURE

A method and apparatus for controlling the beginning of the sterilizing period of a gaseous permeable load in a sterilizer by sensing the temperature difference between a static environment and a dynamic environment and by beginning the sterilizing period when the sensed difference reaches a predetermined value.

---

This invention relates to a method and apparatus relating to sterilizers and the control thereof and more specifically to a method and apparatus for simulating air and steam mixture conditions within a chamber and/or a gaseous permeable load within a sterilizer. In the past the sterilizing cycle in steam sterilizers has been controlled responsive to a temperature or pressure sensitive device within the chamber of the sterilizing vessel. Sterilization of fabrics or other gaseous permeable loads present a problem of air entrapped therein which results in substantial discrepancies in the temperature of the sterilizing steam both in the gaseous permeable load and in the chamber surrounding the load, which is a factor of very substantial importance in guaranteeing adequate sterilization. Such discrepancies must be compensated for by extending the sterilizing period or preventing timing of the sterilizing period until such time as the entrapped air has been removed from the fabric or other gaseous permeable loads.

In order to overcome this very substantial problem in accurately timing an effective sterilization period, it has been common practice in the past to prevent timing from occuring until a preselected extended period after steam had been introduced, which in and of itself will not necessarily provide an accurate test as to whether such conditions have been overcome prior to initiation of timing, and sterility may never be fulfilled within the timed period.

In order to overcome these disadvantages a device has recently been invented for simulating the conditions of such loads and providing means responsive to such simulated conditions for controlling the sterilizing period or the initiation of timing thereof. Such a device is described in copending U.S. application Ser. No. 304,065 filed Aug. 23, 1963 by Kenneth Marden Henfrey, now U.S. Patent No. 3,402,991.

The present invention provides a substantially improved simulator over that shown and described in the Henfrey application. For each change in operating temperature of the steam in the sterilizer, there must be corresponding adjustment in the temperature setting of the load simulator described in the Henfrey application. Whereas the present invention overcomes this disadvantage by comparing a sampling of static steam from the sterilizer and a sampling of good quality (dynamic) steam at the selected pressure and temperature thereby compensating for difference in operating temperatures and pressures. This is accomplished by providing a static chamber communicating with the sterilizing chamber in which static chamber there is retained a static environment of the steam condition simulating those of the gaseous permeable load, and/or conditions of the chamber itself. Secondly, there is provided a dynamic environment passing directly from the sterilizing chamber thereby providing good quality steam at the selected temperature and pressure; and thirdly, means comparing or sensing the difference in selected conditions of the static and dynamic environments thereby to compensate for various temperatures and pressure to the end that the shortest necessary sterilizing period is timed for the selected temperature and pressure. Thus, it is a significant object of this invention to provide an improved method and apparatus for simulating conditions of a sterilizing chamber and more particularly entrapped air conditions in gaseous permeable loads in sterilizing vessels.

It is another significant object of this invention to provide apparatus for simulating such conditions which requires no adjustment for compensating for variations in selected temperatures and pressures within the sterilizing vessel.

It is a further object of this invention to provide a method and apparatus for sensing selected conditions at selected distal positions in said chamber and actuating selected controls responsive to a selected differential of said conditions at said positions.

Other objects and advantages of this invention will be particularly set forth in the claims and will be apparent from the following description, when taken in connection with the accompanying drawings, in which:

FIGS. 1–4 inclusive are diagrammatic views of one embodiment of my invention illustrating the principle therof;

FIG. 5 is a detailed side elevational view broken away and partly in section of the simulator portion of the FIGS. 1–4 embodiment of this invention;

FIG. 6 is a partial right-hand end elevational view of the FIG. 5 embodiment.

Figures 1, 2:
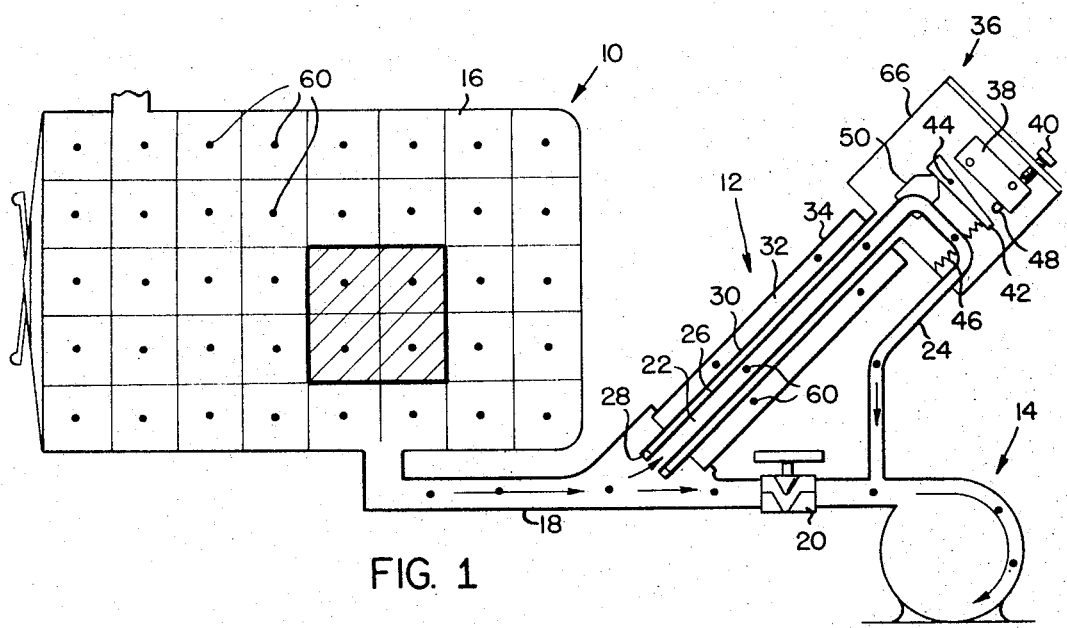

With reference to FIGS. 1–4 inclusive, there is diagrammatically illustrated in these figures a sterilizing vessel generally indicated by the numeral 10, a load simulator generally indicated by the numeral 12, and a vacuum pump generally indicated by the numeral 14. The sterilizing vessel 10 is of any generally known construction having sterilizing chamber 16 communicating through a conduit 18 to the load simulator 12 and through a valve 20 to the vacuum pump 14.

The simulator 12 comprises what shall hereinafter be referred to as a "dynamic chamber" 22 through which dynamically passes an environment of the steam and air mixture or whatever other environment exists in the chamber 16 upon pressure reduction by the vacuum pump 14. As the quality of steam improves in the chamber 16, it does likewise through the dynamic chamber 22 and therefore is generally referred to as the environment of "good quality steam" since it is always equal in quality and usually better than is present in the static chamber hereinafter described. The dynamic chamber 22 communicates at its lower left end with the conduit 18 and is connected through a conduit 24 to the vacuum pump 14. The dynamic chamber 22 is formed by an elongated thermal responsive linearly expandable tubular member 26 preferably of brass. An annular static chamber 32 has an inside sidewall formed by a concentric coaxial elongated thermal responsive linearly expandable tubular member 30 spaced from tubular member 26 by a spacer 28 brazed therebetween. The function of the annular static or simulator chamber 32 is to retain a substantially static sampling of the environment under prevailing conditions of the sterilizing chamber 16. It will be understood from this description that the word "static" as used throughout the specification and claims is used to define equilibrium of pressure existing in a closed environment such as exists in a "static tube" used in the science of aeronautics. It will be further understood that in lieu of the vacuum pump 14, the "dynamic chamber" 22 may be simply open to exhaust thereby permitting flow of steam to atmosphere.

The outside sidewall of the annular static chamber 32 is defined by an elongated concentric coaxial tubular member 34 preferably of a non-corrosive material such as brass. The thermal expansion of outside sidewall 34 has no effect on this invention because the thermal responsive control is carried in its entirety on the upper end thereof. A switch assembly and housing generally indicated by the numeral 36 is rigidly mounted at the upper end of the inner sidewall 30 of the outer annular static chamber 32 and movable therewith.

Internally of the switch assembly and housing 36 is a micro or other suitable type switch 38 adjustably mounted therein in a manner described with reference to FIGS. 5 and 6. Switch 38 is adjustable by a knurled adjustment screw 40 for the hereinafter described purpose. There is a switch actuator 42 pivotally mounted by a bolt 43 to the housing 36 and is biased counterclockwise by a compression spring 46 into an engaging position with the actuator pin 48 of the microswitch 38. There is an actuator button or head 50 mouned at the upper end of the conduit or inner elongated tubular member 26. Movement of actuator head 50 upwardly to the right as viewed in the figures results in pivoting the switch actuator 42 in a clockwise direction responsive to thermal linear expansion of the tubular member 26 in the manner hereinafter described. In this embodiment, the switch 38 is a normally open switch which is closed by the actuator 42 when in the neutral position illustrated in FIGS. 1, 3 and 4 and whenever there is not sufficient air in the static chamber to pivot the actuator 42 in opposition to spring 46.

The knurled adjustment screw 40 functions to adjust the switch 38 so that the assembly may be set to match the level of air concentration found to be critical for any given sterilizer chamber 16. However, in view of the fact that this improved load simulator compares the temperature of good quality steam passing through the dynamic chamber 22 with the poorer quality steam conditions which are simulated in the static chamber 32, it is not necessary to compensate for variations in the selected sterilizing temperatures regardless of what sterilizing temperature is selected, as for example, within a range of 250° F. to 275° F. This is the significant advantage of this invention.

It will be understood that the tubing 24 is of yieldable copper or other suitable material and preferably of small diameter as for example ¼" thereby to only "bleed" the good quality steam through the dynamic chamber. Tubing 24 has at least one bend therein as is illustrated in FIG. 1 such that, upon expansion and contraction of the inner elongated tubular member 26, the copper conduit 24 readily yields and is readily movable therewith.

As viewed in FIGS. 1–4 it will be noted that the dynamic chamber 22 and static chamber 32 make an acute angle with the conduit 18 extending from the sterilizer. This is highly desirable in order that the static chamber 32 readily receives an environment from the sterilizing chamber 16. The present invention is particularly suitable for steam sterilization cycles including a pre-vacuum period during which the valve 20 is open to the evacuation or vacuum pump 14. After evacuation, the valve 20 is closed and there is admission of steam diagrammatically illustrated in FIG. 2 in the chamber 16 at 52 from a source not shown. During admission of steam, the vacuum pump 14 continues to bleeed steam through the conduit 24. After sterilization, the steam is again evacuated by the vacuum pump 14 during which the valve 20 is open.

While the present embodiment of this invention is constructed to control a timing device, it will be understood that the concept of the invention is much broader and could be applied to controlling any other type of control apparatus such as valving for determining the commencement of and/or termination of the sterilizing cycle, or any other control means effective to determine the length of sterilizing time, thereby to vary the sterilizing time in accordance with temperature comparisons or differentials between the static chamber 32 and the dynamic chamber 22 of the load simulator 12. If a comparatively large quantity of air is trapped in the static chamber 32 after the valve 20 is closed then the sidewall 26 of the dynamic chamber 22 reaches a higher temperature, and expands linearly or longitudinally a greater length than the inner sidewall 30 of the static chamber 32 which is cooler due to trapped air, thereby moving the actuator button 50 upwardly to the right as indicated by the arrow 54 of FIG. 2. This expansion of the tubular member 26 results in pivoting the actuator arm 42 clockwise about the pivot bolt 43 to prevent actuation of the normally open microswitch 38 and delays or prevents timing of the sterilization cycle from occurring.

If substantially all air is extracted from the chamber 16 and load 58 therein, then the differential in longitudinal thermal expansion of the tubular members 26 and 30 is not sufficient to pivot the actuator 42 in a clockwise direction; thus, the spring 46 maintains the actuator in contact with the actuating pin 48 hereby actuating the timer 56. Once the timer 56 is actuated it is no longer controlled by the switch 38 according to this embodiment of the invention.

Air concentration in gaseous permeable goods such as cotton goods during sterilizing cycles The volume or capacity of the sterilizer chamber 16 is shown in the diagrams of FIGS. 1–4 and is divided into 40 squares of equal size. A smaller space comprising only four squares is shown in the diagonally crossed darkened area which represents a pack 58 of cotton goods taking up part of the chamber space (this could be a four cubic foot cotton load in a forty cubic foot sterilizer chamber). Air molecule concentration within each square of the chamber 16 is diagrammatically represented by solid dots 60. The arrows of FIGS. 1 and 3 indicate the path of travel of the air molecules. The arrows of FIGS. 2 and 4 indicate steam pressure and path of travel of air molecules.

FIG. 1.—Pre-vacuum

As the vacuum pump 14 is turned on, the atmospheric air within the sterilizer chamber 16 is evacuated and a relatively low partial pressure of air is attained. Preferably, steam is then introduced and a second vacuum is drawn in accordance with well-known practice. The condition then established in the chamber is such that the molecules of air 60 remaining in the sterilizer are equally distributed throughout the volume of the chamber 16 and cotton pack 58 and the static chamber 32 and dynamic chamber 22.

FIG. 2.—Sterilization

Steam 52 is then introduced for sterilization from a source of supply to the sterilizer. The main valve 20 in the exhaust conduit 18 is closed but a relatively small elongated sampling bleed line comprising the dynamic chamber 22 through the center of the load simulator 12 is still open for dynamic steam flow to the pump 14. As the steam fills the sterilizer chamber, it becomes steam of high purity as the partial pressure of air once in the chamber 16 is either forced out the exhaust conduit 18 to the pump 14 and the closed end of the static chamber 32, or is concentrated into the sterilizer load 58. It is only after steam is introduced for the sterilizing portion of the cycle that the timer and load simulator are in circuit as determined by controls not a part of this invention.

A volume of steam vapor equal to the size of the pack 58 is forced into the pack, and carries with it some molecules of air which were outside the pack during the pre-vacuum stage of FIG. 1. The steam vapor 52 collapses in volume as it condenses on and in the cold fabric pack 58 and more steam is forced into the pack. As seen in the diagram, as each volume of steam vapor passes into the pack and condenses, more amounts of air are drawn into the pack with more steam. (Air, represented by black dots.)

Thus, a small absorbent pack of gaseous permeable goods in a large sterilizer is subject to concentration of air. Where air pockets occur, the steam required for sterilization is reduced in pressure and temperature by the high partial pressure of the concentrated air.

The high purity steam with its high temperature flows upward through the center dynamic chamber 22 of the load simulator, into the vacuum pump 14. The air molecules that were originally in the static chamber 32 and in the exhaust conduit 18 are carried ahead of the steam into the dead-end space of the static chamber 32 around the outside of the dynamic chamber 22 of the load simulator. The steam comes in contact with the cold outer sidewall 34 of the static chamber, collapses in volume as it turns to condensate droplets leaving air carried by the steam to the upper end thereof and more steam is forced into the dead end tubing area carrying more air molecules to the upper end of the static chamber in the same manner as occurs in the pack of goods 58. Thus, as more and more steam is drawn into this outer static chamber, a concentrated amount of air is deposited. This concentration of air simulates the action within the pack 58.

The inner sidewall 30 of static chamber 32 and the sidewall 26 of dynamic chamber 22 are constructed of identical brass composition; therefore, the thermal expansion due to heating of both sidewalls results in the same amount of elongation of both chambers if they are both at the same temperature conditions.

In this FIG. 2 example, the sidewall 26 of the dynamic chamber is at a higher temperature due to high purity steam passing therethrough while the inner sidewall 30 of static chamber 32 is at lower temperature at least along the top section surrounded by and in contact with entrapped air molecules. Thusly, this device senses the differential in temperature between the poor quality steam at the top of the static chamber and good quality steam at the lower or distal end of the static chamber and within the dynamic chamber. The result is a greater net elongation of the dynamic chamber sidewall than the inside sidewall of the static chamber, and the actuating head 50 thereof is carried upwards to the right against the actuating lever 42. The actuating lever 42 is pivoted away from the actuating pin 48 of the microswitch 38 and an electrical signal energizes the delay light 55 and deenergizes the timing light 56; thus indicating such high concentration of air in the pack as to prevent effective sterilizing.

The swtch 38 of the load simulator is electrically connected with the sterilizer control or timing circuitry such that whenever the air concentration conditions are in excess of the selected level and energize the delay light, they also preferably recycle the sterilizer timer and cycle controls, or prolong the selected timed period, or may actuate any other suitable sterilizer control means without departing from the spirit of this invention.

FIG. 3.—Pre-vacuum

Figure 3:
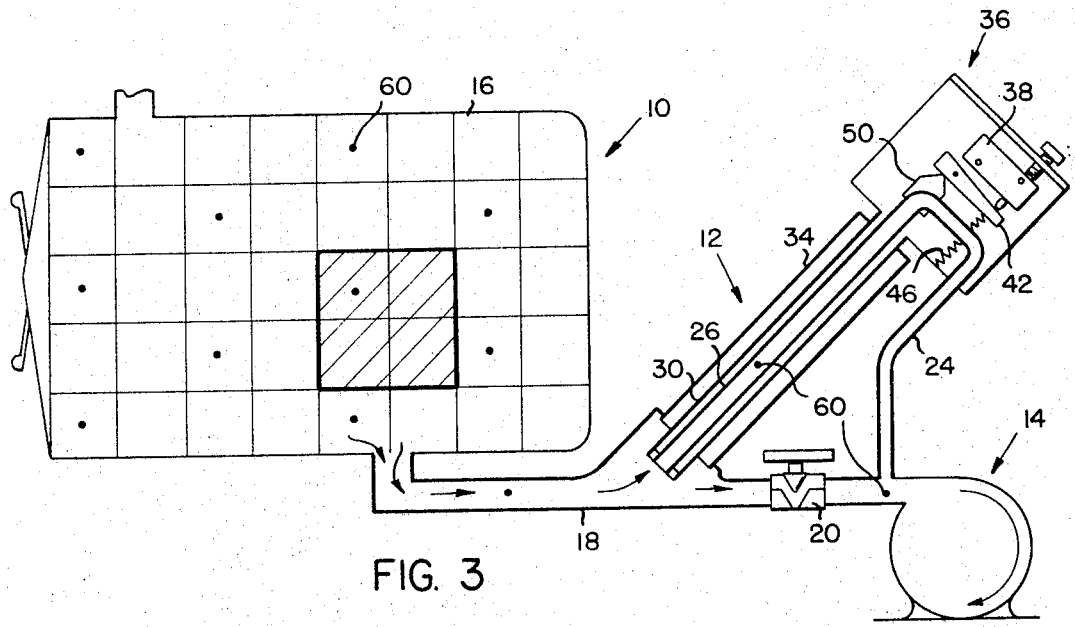

There has been a greater amount of air removed from the chamber by the pump 14 in FIG. 3 than in FIG. 1 during the pre-vacuum stage (preferably pulsing of steam), thereby greatly reducing the quantity of air molecules 60 present throughout the system. Instead of one dot 60 for each square as was shown in FIG. 1, there is now only one dot to each four squares. This represents only one-quarter as much air left in the entire sterilizer. Likewise, there is only one dot in the cotton pack as compared to the previous four. In the exhaust line 18 and load simulator 12 there is likewise only a smaller quantity of air as compared to that in FIG. 1. The sidewalls of the chambers of load simulator 12 have not yet been subjected to steam temperature and are, therefore, shown equal in length just as they were in FIG. 1 with the actuating button 50 and actuating lever 42 in neutral position with respect to the microswitch 38. Setting of the knurled adjustment screw 40 above the switch would be such that with equal temperatures in the two chambers of the load simulator 12, the microswitch 38 would be in the neutral position closed electrically to the timing light 56 and would not actuate the delay pilot light 55 circuit.

Figure 4:
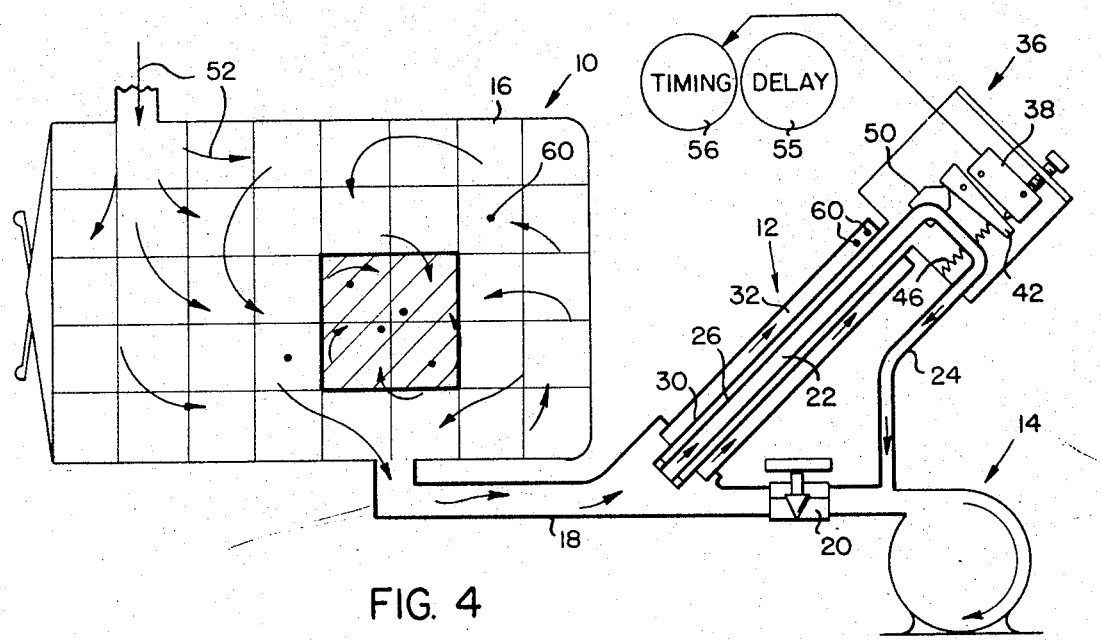

FIG. 4.—Sterilization

As steam enters the sterilizer chamber 16 steam is concentrated within the pack 58 in the same manner described with reference to FIG. 2. The available air molecules for forming pockets in the pack have been reduced to one-quarter that of FIG. 2; therefore, with other things being equal, the concentration of air in the pack has been reduced to one-quarter. Likewise, only one-quarter the amount of air is trapped in the closed end of the static chamber 32 of the load simulator. Under these conditions, the steam is of high enough purity that it will not carry large enough quantities of air into the static chamber to delay timing. Instead, high purity steam passes into the static chamber 32, heating it to the same high temperature as the dynamic chamber 22. Now, even though increased temperature has caused the sidewalls 26 and 30 of the load simulator to longitudinally expand, they have both become elongated in substantially the same exact proportion. This results in the actuating head 50 and lever 42 remaining in the neutral position with respect to the microswitch as they were in FIG. 3, thereby maintaining the microswitch 38 closed electrically to the timing circuit to the timing light 56. The timing light 56 and timer circuit remain actuated and the sterilizing process is permitted to continue uninterrupted to completion if these conditions continue throughout the sterilizing period. However, if the air concentration level of the pack 58 as simulated in the load simulator 12 exceeds the selected level for which the switch 38 is set, then the delay light 55 is energized and the sterilizing timer and cycle controls recycle or are otherwise controlled in any suitable manner correcting for the unacceptable level of air concentration.

The mechanical structure of the load simulator assembly shown in FIGURES 5 and 6

The basic components of the load simulator assembly have been described above with reference to FIGS. 1–4.

The actuator head 50 is rigidly attached, as for example by brazing internally of the brass dynamic chamber sidewall 26. Dynamic chamber sidewall 26 is slidably mounted longitudinally through a hex bushing 62. The lower end of sidewall 26 is spaced at its lower end from sidewall 30 by a brass spacer 28 brazed therebetween. Both sidewalls 26 and 30 are identical in composition; seamless brass tubing, and of approximately the same length—approximately 24 inches. The upper end of the inner static chamber sidewall is brazed at 64 within the large lower opening of the hex bushing 62 which in turn is rigidly mounted to a switch box housing 66 by a hex nut 67 threadedly received on the upper end of hex bushing 62. Washers 68 are provided between an external shouldered portion of hex bushing and the housing 66.

An externally threaded connector 70 rigidly mounted on sidewall 30 connects the entire load simulator assembly to the top of the outside sidewall of brass steam piping 34 in a manner that permits the full length of tubular sidewalls 26 and 30 to freely expand and contract with changes of steam temperatures and without interference. The lower end of the outside sidewall 34 is connected to the exhaust conduit 18 by any suitable connection (not shown in detail). The flexible copper tubing 24 is brazed in a side opening in the actuator head 50 and connects with the vacuum pump 14.

The actuator lever 42 and a pair of switch supporting brackets 71 are all pivotally mounted on bolt 43 having a hex shoulder for spacing the right-hand bracket 71 as viewed in FIG. 6 from the housing 66. A screw 44 is threaded into the left end of bolt 43 to loosely hold the assembly together and a hex nut 74 is threaded onto the right end of bolt 43 thereby to permit easy pivoting of actuator lever 42. The slightest movement of the actuator head 50 is amplified by the longer length of the opposite end of the actuator lever 42 engaging the sensitive actuator pin 48 of the microswitch 38.

This microswitch 38 is rigidly mounted between the brackets 71 by a pair of bolts 76. The right ends of brackets 71 are biased in a counterclockwise direction about pivot bolt 43 by a pair of tension springs 78 which are opposed by adjustment screw 40 adjustably mounted by threading in housing 66. Adjusting the switch 38 to a desired set point is accomplished with screw 40 and locked in set position by lock nut 80.

The compression spring 46 biases actuator lever 42 in a counterclockwise direction about pivot bolt 43 in opposition to actuator head 50. A terminal strip 82 is mounted on housing 66 and is used to connect circuit wires from the microswitch 38 to suitable timer controls as hereinbefore described.

This simulator simulates load conditions. It preferably presumes the most difficult conditions within the load and guards against air entrapment in the goods sufficient to interfere with proper sterilization. In the unlikely event of air leakage caused by a condition such as a damaged gasket, the load simulator will prevent the timer from running and the cycle from completion. Hence, when the timer is not arrested by the simulator there is positive assurance of proper sterilization.

Preferably, the timer and load simulator are not in circuit until after chamber heat-up, i.e., when a temperature sensitive device is satisfied that required sterilizing temperature has been established, exposure timing shall commence and the load simulator is in circuit. Thereafter, timing shall continue only as long as pre-programmed temperature is present. Failure to satisfy the load simulator will prevent timing from starting or continuing and shall be signalled by the energizing of the "delay" light.

Timing continues only as long as the temperature is maintained. Should the temperature drop below that selected, the cycle is interrupted by another device not a part of this invention, timing stops and the timer recycles to original setting.

Figure 7:
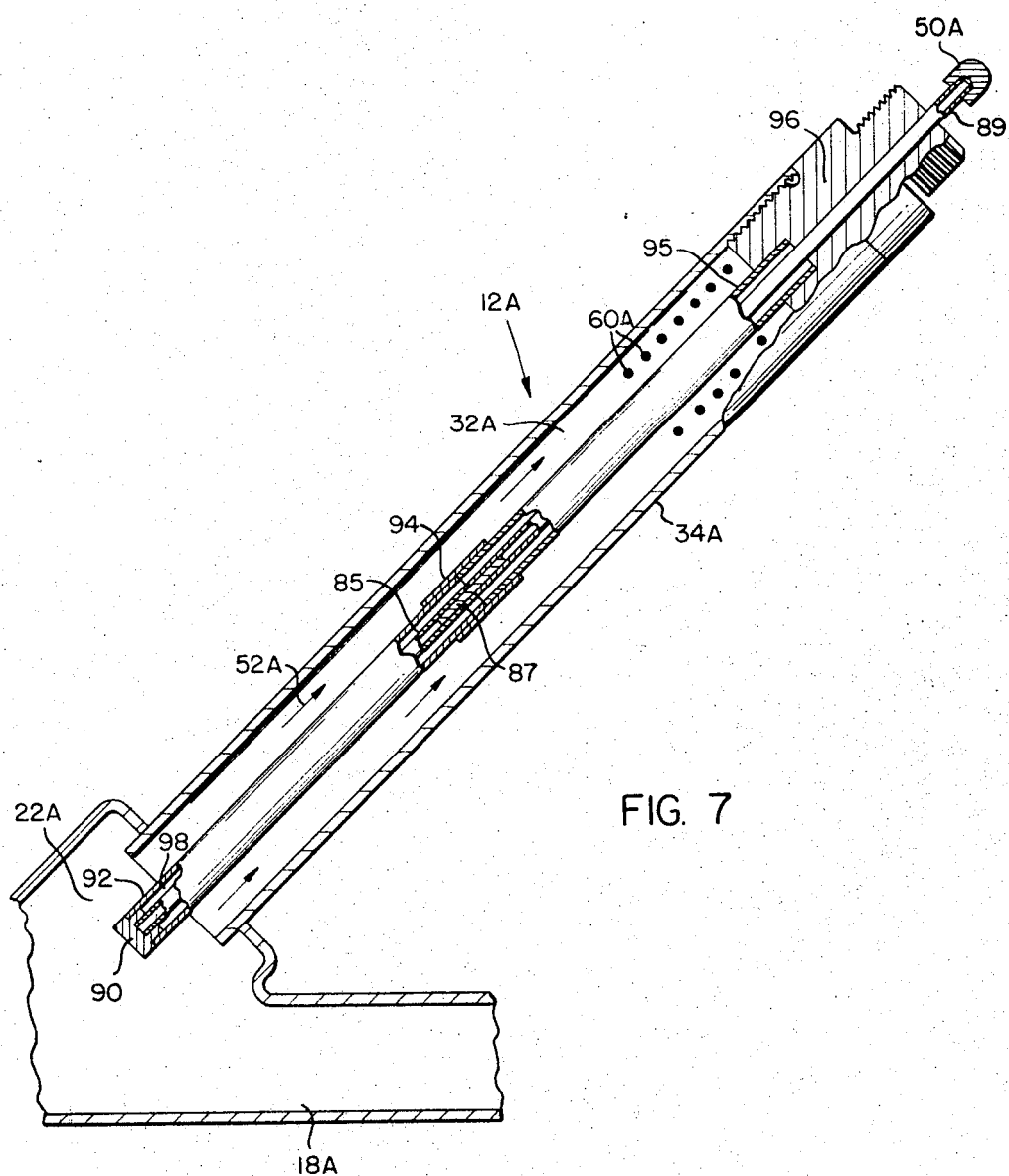
FIG. 7 is a cross-sectional view of a portion of a second embodiment of this invention.

With reference to FIG. 7, there is illustrated a second embodiment of this invention which operates on the same basic principle of sensing temperature at selected distal positions in the load simulator chamber and actuating the timer or delay light responsive to a selected differential in temperature between the two distal points.

The load simulator 12A is mounted in the exhaust conduit 18A in the same manner as the outside sidewall 34 of the FIGS. 1–6 embodiment.

In this second embodiment, the differential sensing is accomplished by inner and outer elongated bimetal tubes having alternate sections of material of different coefficients of expansion, as for example stainless steel and brass. The opposing coaxially coextensive sections of the two bimetal tubes are of different metal so that any net differential in temperature between the upper end of the simulator 12A and the lower end thereof is reflected in actuation of an actuator head 50A located at the upper end of the inner elongated bimetal tube.

We provide a lower inner stainless steel tubular member 85 which is rigidly connected at its upper end, by a brass rod or plug 87 and brazing, to the lower end of an upper inner brass tubular member 89 upon which is mounted the actuator 50A. The lower end of the stainless steel tubular member 85 is rigidly mounted, as for example, by brazing to a spacer 90 to which is also mounted the lower end of a lower outer brass tubular member 92. Tubular member 92 is rigidly connected at its upper end, by means of a collar 94 and brazing, to the lower end of an upper outer stainless steel tubular member 95 which in turn is rigidly mounted at its upper end to a connector 96 being threadedly received internally of an outside chamber sidewall 34A defining a static chamber 32A. It will be understood that the upper end of upper inner tubular member 89 is slidable within a longitudinal opening of the connector 96.

The FIG. 7 embodiment is illustrated with entrapped air molecules 60A and good quality steam 52A which is intended to correspond diagrammatically to the FIG. 2 diagrammatic view.

An annular opening 98 defined intermediate the inner bimetal tubes 85–89 and the outer bimetal tubes 92–94 is filled with a heat conductive fluid such as heat transfer oils or mercury so that substantially the same temperature is transferred to the inner bimetal tube from the steam and air as exists on the outside surface of the outer bimetal tube.

The principle of this embodiment is that by reason of the difference of coefficient of expansion of the brass and stainless steel tubular portions of the bimetal tubes in the alternate arrangement thereof with the stainless steel being the upper outer tubular member and lower inner tubular member and vice versa with the brass, any difference in temperature between the upper end and the distal lower end of the chamber 32A will be reflected in a corresponding movement of the actuator head 50A. The lower end of the static chamber 32A flares out into an enlarged chamber 22A defining a "dynamic" chamber which is simply an enlarged area in the exhaust conduit 18A.

While the preferred form of mechanism of this invention has been shown and described, it will be apparent that various modifications and changes may be made therein particularly in the form and relation of parts, without departing from the spirit of this invention as set forth in the appended claims.

We claim:
1. In combination with a sterilizer, a chamber communicating with said sterilizer, means in said chamber for sensing a selected condition at selected distal positions in said chamber and actuating means responsive to a selected differential of said condition between said positions for actuating a sterilizing element.

2. The combination defined in claim 1 in which said chamber comprises a fluid chamber and said condition is temperature.

3. A simulator for simulating temperature conditions in a first chamber comprising; a static chamber open at one end communicating with said first chamber and closed at the other end for retaining an environment simulating a condition of said first chamber; and means in said static chamber for sensing the temperature differential between the environments substantially at the closed end and open end of said static chamber.

4. A simulator for simulating selected conditions in a first chamber comprising: a static chamber communicating with said first chamber, means in said static chamber for retaining an environment simulating a prevailing condition of said first chamber, a dynamic chamber communicating with said first chamber, means for dynamically passing an environment from said first chamber through said dynamic chamber, and means for sensing the difference in a selected condition of said static chamber and of said dynamic chamber.

5. A simulator in accordance with claim 4 including means responsive to said sensing means for actuating a control means when a predetermined differential in said conditions is sensed.

6. A simulator for simulating selective conditions in a first chamber comprising:
a static chamber communicating with said first chamber,
means in said chamber for retaining an environment simulating prevailing conditions of said first chamber, a dynamic chamber communicating with said first chamber, means for dynamically passing an environment from said first chamber through said dynamic chamber, means for sensing the difference in the temperature of said static chamber and said dynamic chamber, and means responsive to said sensing means for actuating a control means.

7. A simulator for simulating air and steam mixture conditions in a gaseous permeable load in a sterilizing chamber comprising:

a static chamber communicating with said sterilizing chamber, means in said static chamber for retaining an environment simulating said conditions in said load in said sterilizing chamber, a dynamic chamber communicating with said sterilizing chamber, means dynamically passing an environment from said sterilizing chamber through said dynamic chamber, means sensing the difference in the temperature in said static chamber and in said dnyamic chamber, and means responsive to said sensing means for actuating a control means when a predetermined temperature differential is sensed.

8. A simulator in accordance with claim 7 in which said static and dynamic chambers are coaxial.

9. A simulator in accordance with claim 8 in which said dynamic chamber communicates between said first chamber and an exhaust means permitting flow of steam from said dynamic chamber.

10. A simulator in accordance with claim 8 in which said sensing means is responsive to movement of at least one end of one of said static and dynamic chambers relative to a corresponding end of the other of said static and dynamic chambers.

11. A simulator in accordance with claim 7 in which said static and dynamic chambers have temperature sensitive expandable adjacent sidewalls being rigidly interconnected at one end, a first actuator means of said sensing means being mounted at the other end of one of said sidewalls and a second actuator means of said sensing means being mounted at the other end of the other of said sidewalls.

12. A simulator in accordance with claim 11 including means for selectively by-passing from said dynamic chamber the dynamic flow of fluid from said first chamber directly to a source of reduced pressure.

13. A simulator in accordance with claim 11 in which said static chamber comprises an elongated dead end space and said dynamic chamber is a substantially coaxial elongated space communicating between said first chamber and a pressure reducing means.

14. A method of simulative sensing a temperature condition of a sterilizing chamber comprising the steps of: comparing temperature of a sampling of a static environment from the chamber with a sampling of dynamic environment from the chamber and actuating selected controls responsive to a selected temperature differential between said samplings.

15. A method for actuating sterilizer control means responsive to temperature in a sterilizing chamber, comprising the steps of: sensing the temperature of fluid in said chamber at selected distal positions in said chamber, and actuating said control means responsive to a selected temperature differential between said positions.

16. A method of simulative sensing temperature conditions of a pressure chamber in an elongated static chamber having an end open to said pressure chamber and a closed end, comprising the step of sensing the temperature differential between the environments at substantially the closed and open ends of said static chamber.

17. A method of simulative sensing a condition in a chamber comprising the steps of: sensing the difference in a selected condition of a substantially static environment of said chamber and of a dynamic flow of environment of said chamber.

18. A method in accordance with claim 17 in which said condition is temperature.

19. A method in accordance with claim 18 including a final step of actuating controls in response to a predetermined difference in temperature.

20. A method of simulative sensing a condition in a first pressure chamber comprising the steps of: simultaneously evacuating said first pressure chamber and a smaller static fluid pressure chamber communicating with said first pressure chamber, sensing the difference in a selected condition of said smaller static chamber and of a dynamic chamber through which dynamically passes a flow of fluid from said first chamber, and actuating controls in response to a predetermined difference in said selected condition.

21. A method in accordance with claim 20 in which temperature is said selected condition.

22. A method of simulative sensing compacted air conditions of a gaseous permeable load in a first pressure chamber comprising the steps of: simultaneously evacuating said first pressure chamber and a smaller static gaseous fluid pressure chamber communicating with said first chamber; introducing steam into both said pressure chambers; sensing the difference in temperature of said smaller chamber and of a dynamic chamber through which passes a dynamic flow of fluid from said first chamber; and actuating controls responsive to a predetermined difference in said temperatures.

References Cited

UNITED STATES PATENTS

| | | | |
|---|---|---|---|
| 1,877,327 | 9/1932 | Ingersoll | 236—1 |
| 2,208,552 | 7/1940 | Walter | 21—98 |
| 2,483,689 | 10/1949 | Bullock | 236—24.5 |
| 2,743,869 | 5/1956 | Smoot | 236—24.5 |
| 2,868,616 | 1/1959 | Poitras | 21—94 XR |
| 3,087,210 | 4/1963 | Neiss | 21—56 XR |
| 3,402,991 | 9/1968 | Henfrey | 21—94 |

MORRIS O. WOLK, *Primary Examiner.*

BARRY S. RICHMAN, *Assistant Examiner.*

U.S. Cl. X.R.

21—94, 98, 103, 104; 23—290; 236—1